(12) United States Patent
Rashid

(10) Patent No.: US 12,499,056 B2
(45) Date of Patent: Dec. 16, 2025

(54) PRIORITIZED UNIFIED TLB LOOKUP WITH VARIABLE PAGE SIZES

(71) Applicant: Akeana, Inc., San Jose, CA (US)

(72) Inventor: Abbas Rashid, Pleasanton, CA (US)

(73) Assignee: Akeana, Inc., Santa Clara, CA (US)

( * ) Notice: Subject to any disclaimer, the term of this patent is extended or adjusted under 35 U.S.C. 154(b) by 1 day.

(21) Appl. No.: 18/398,335

(22) Filed: Dec. 28, 2023

(65) Prior Publication Data

US 2024/0220416 A1    Jul. 4, 2024

Related U.S. Application Data

(60) Provisional application No. 63/605,620, filed on Dec. 4, 2023, provisional application No. 63/602,514, filed
(Continued)

(51) Int. Cl.
*G06F 12/1027* (2016.01)
*G06F 12/1009* (2016.01)

(52) U.S. Cl.
CPC ...... *G06F 12/1027* (2013.01); *G06F 12/1009* (2013.01)

(58) Field of Classification Search
CPC ............. G06F 12/1027; G06F 12/1009; G06F 2212/1008; G06F 2212/1016;
(Continued)

(56) References Cited

U.S. PATENT DOCUMENTS

| 5,493,660 A | * | 2/1996 | DeLano | G06F 12/1027 |
| | | | | 711/206 |
| 6,934,809 B2 | | 8/2005 | Tremblay et al. | |

(Continued)

FOREIGN PATENT DOCUMENTS

WO    2022117687 A1    6/2022

OTHER PUBLICATIONS

Elnawawy, H., Chowdhury, R. B. R., Awad, A., & Byrd, G. T. (2019). Diligent TLBs: a mechanism for exploiting heterogeneity in TLB miss behavior. Proceedings of the ACM International Conference on Supercomputing, 195â205. https://doi.org/10.1145/3330345.3330363 (Year: 2019).*

*Primary Examiner* — Reginald G Bragdon
*Assistant Examiner* — Zakaria Mohammed Belkhayat
(74) *Attorney, Agent, or Firm* — Adams Intellex, PLC

(57) ABSTRACT

Techniques for address translation are disclosed. A processor core is accessed. The processor core includes a memory management unit (MMU) and a unified translation lookaside buffer (TLB) within the MMU. The TLB is configured to support a plurality of page sizes, and the processor core is coupled to an external memory system. The TLB receives a lookup request for a virtual memory address, wherein the virtual memory address corresponds to a process running on the processor core. The TLB accesses a linked list that comprises a page size priority order for the plurality of page sizes. A lookup is performed in the TLB on the virtual memory address, and the lookup is conducted in the page size priority order. The linked list is updated, the updating moves a page size associated with the lookup to a location in the linked list, and a physical address is returned.

23 Claims, 13 Drawing Sheets

Related U.S. Application Data on Nov. 24, 2023, provisional application No. 63/547,574, filed on Nov. 7, 2023, provisional application No. 63/547,404, filed on Nov. 6, 2023, provisional application No. 63/546,769, filed on Nov. 1, 2023, provisional application No. 63/545,961, filed on Oct. 27, 2023, provisional application No. 63/542,797, filed on Oct. 6, 2023, provisional application No. 63/526,009, filed on Jul. 11, 2023, provisional application No. 63/521,365, filed on Jun. 16, 2023, provisional application No. 63/471,283, filed on Jun. 6, 2023, provisional application No. 63/467,335, filed on May 18, 2023, provisional application No. 63/463,371, filed on May 2, 2023, provisional application No. 63/462,542, filed on Apr. 28, 2023, provisional application No. 63/444,619, filed on Feb. 10, 2023, provisional application No. 63/439,761, filed on Jan. 18, 2023, provisional application No. 63/436,133, filed on Dec. 30, 2022, provisional application No. 63/436,144, filed on Dec. 30, 2022, provisional application No. 63/435,831, filed on Dec. 29, 2022.

(58) Field of Classification Search
CPC ......... G06F 2212/502; G06F 2212/651; G06F 2212/652; G06F 2212/654; G06F 2212/681; G06F 2212/684; G06F 12/1036
See application file for complete search history.

(56) References Cited

U.S. PATENT DOCUMENTS

| | | | |
|---|---|---|---|
| 7,506,105 | B2 | 3/2009 | Al-Sukhni et al. |
| 10,013,356 | B2 | 7/2018 | Chou |
| 10,671,394 | B2 | 6/2020 | Britto et al. |
| 10,929,948 | B2 | 2/2021 | Benthin et al. |
| 11,288,405 | B2 | 3/2022 | Belgarric et al. |
| 11,403,099 | B2 | 8/2022 | Cerny et al. |
| 11,403,225 | B2 | 8/2022 | Zheng et al. |
| 11,429,529 | B2 | 8/2022 | Hornung et al. |
| 11,442,863 | B2 | 9/2022 | Shulyak et al. |
| 11,474,130 | B2 | 10/2022 | Lentz et al. |
| 11,486,911 | B2 | 11/2022 | Tuncer et al. |
| 11,687,466 | B1* | 6/2023 | Favor ................. G06F 12/1054 711/207 |
| 2005/0254285 | A1* | 11/2005 | Chan .................... G11C 11/417 365/154 |
| 2011/0153955 | A1* | 6/2011 | Herrenschmidt ... G06F 12/1027 711/146 |
| 2014/0195771 | A1* | 7/2014 | Adderly .............. G06F 12/1027 711/204 |
| 2022/0004639 | A1 | 1/2022 | Yardi et al. |
| 2022/0029780 | A1 | 1/2022 | Dafali |
| 2022/0197657 | A1 | 6/2022 | Soundararajan et al. |
| 2022/0309000 | A1* | 9/2022 | Campbell ........... G06F 12/0864 |

* cited by examiner

PRIORITIZED UNIFIED TLB LOOKUP WITH VARIABLE PAGE SIZES

RELATED APPLICATIONS

This application claims the benefit of U.S. provisional patent applications "Prioritized Unified TLB Lookup With Variable Page Sizes" Ser. No. 63/435,831, filed Dec. 29, 2022, "Return Address Stack With Branch Mispredict Recovery" Ser. No. 63/436,133, filed Dec. 30, 2022, "Coherency Management Using Distributed Snoop" Ser. No. 63/436,144, filed Dec. 30, 2022, "Cache Management Using Shared Cache Line Storage" Ser. No. 63/439,761, filed Jan. 18, 2023, "Access Request Dynamic Multilevel Arbitration" Ser. No. 63/444,619, filed Feb. 10, 2023, "Processor Pipeline For Data Transfer Operations" Ser. No. 63/462,542, filed Apr. 28, 2023, "Out-Of-Order Unit Stride Data Prefetcher With Scoreboarding" Ser. No. 63/463,371, filed May 2, 2023, "Architectural Reduction Of Voltage And Clock Attach Windows" Ser. No. 63/467,335, filed May 18, 2023, "Coherent Hierarchical Cache Line Tracking" Ser. No. 63/471,283, filed Jun. 6, 2023, "Direct Cache Transfer With Shared Cache Lines" Ser. No. 63/521,365, filed Jun. 16, 2023, "Polarity-Based Data Prefetcher With Underlying Stride Detection" Ser. No. 63/526,009, filed Jul. 11, 2023, "Mixed-Source Dependency Control" Ser. No. 63/542,797, filed Oct. 6, 2023, "Vector Scatter And Gather With Single Memory Access" Ser. No. 63/545,961, filed Oct. 27, 2023, "Pipeline Optimization With Variable Latency Execution" Ser. No. 63/546,769, filed Nov. 1, 2023, "Cache Evict Duplication Management" Ser. No. 63/547,404, filed Nov. 6, 2023, "Multi-Cast Snoop Vectors Within A Mesh Topology" Ser. No. 63/547,574, filed Nov. 7, 2023, "Optimized Snoop Multi-Cast With Mesh Regions" Ser. No. 63/602,514, filed Nov. 24, 2023, and "Cache Snoop Replay Management" Ser. No. 63/605,620, filed Dec. 4, 2023.

Each of the foregoing applications is hereby incorporated by reference in its entirety.

FIELD OF ART

This application relates generally to processor memory access and more particularly to a prioritized unified translation lookaside buffer (TLB) lookup with variable page sizes.

BACKGROUND

Microprocessors are found in a wide variety of electronic devices such as smartphones, tablet computers, televisions, laptop computers, desktop computers, gaming consoles, and more. The processors support computations, data processing, image processing, communications, and more. The processors interface with random-access memory (RAM) to fetch instructions and data for support of these applications and functions. The amount of RAM required for a device depends on the applications and programs that it executes, as well as how many programs are executing concurrently. Modern operating systems perform multitasking. Multitasking, in an operating system, enables execution of more than one computer task (such as the operation of an application program) at a time. The operating system performs context switching to time slice between multiple threads of execution. The operating system kernel may interface with hardware elements within a processor to perform these functions.

Main categories of processors include Complex Instruction Set Computer (CISC) types, and Reduced Instruction Set Computer (RISC) types. In a CISC processor, one instruction may execute several operations. The operations can include memory storage, loading from memory, an arithmetic operation, and so on. In contrast, in a RISC processor, the instruction sets tend to be smaller than the instruction sets of CISC processors, and may be executed in a pipelined manner, having pipeline stages that may include fetch, decode, and execute. Each of these pipeline stages may take one clock cycle, and thus, the pipelined operation can allow RISC processors to operate on more than one instruction per clock cycle.

Integrated circuits (ICs) such as processors may be designed using a Hardware Description Language (HDL). Examples of such languages can include Verilog, VHDL, etc. HDLs enable the description of behavioral, register transfer, gate, and switch level logic. This provides designers with the ability to define levels in detail. Behavioral level logic allows for a set of instructions executed sequentially, while register transfer level logic allows for the transfer of data between registers, driven by an explicit clock and gate level logic. The HDL can be used to create text models that describe or express logic circuits. The models can be processed by a synthesis program, followed by a simulation program to test the logic design. Part of the process may include Register Level Transfer (RTL) abstractions that define the synthesizable data that is fed into a logic synthesis tool which in turn creates the gate-level abstraction of the design that is used for downstream implementation operations.

Modern processors can support a wide variety of applications. Applications can be developed in a high-level language such as C, C++, and the like. A toolchain can be used to convert high-level language code into machine instructions that are executable by the processor. The toolchain can include a compiler, a linker, an archiver, and/or other components. The compiler can convert high level code constructs into lower-level assembly code and/or machine instructions. The machine instructions can be compiled into binary applications. Additionally, the machine instructions can be compiled into libraries that are loaded into memory during runtime. The libraries can be shared libraries that are used by multiple binary applications. Multiple binaries and libraries may be resident in memory simultaneously. Modern operating systems and processors can enable powerful applications for a variety of industries and business segments.

SUMMARY

Virtual memory is a technique in which secondary memory can be used to supplement the main memory. The addresses a program may use to reference memory are distinguished from the addresses the memory system uses to identify physical storage locations, and virtual memory addresses are translated automatically to the corresponding physical addresses. The size of virtual storage is limited by the addressing scheme of the computer system and the amount of secondary memory that is available, and not by the amount of physical memory in a system. Virtual memory provides some key advantages for handling memory usage of computer processes and applications. The translation between virtual memory addresses and physical memory addresses is improved by using a translation lookaside buffer (TLB).

Techniques for address translation are discussed herein. A processor core is accessed. The processor core includes a memory management unit (MMU) and a unified translation lookaside buffer (TLB) within the MMU. The TLB is configured to support a plurality of page sizes, and the processor core is coupled to an external memory system. The TLB receives a lookup request for a virtual memory address, wherein the virtual memory address corresponds to a process running on the processor core. The TLB accesses a linked list that comprises a page size priority order for the plurality of page sizes. A lookup is performed in the TLB on the virtual memory address, and the lookup is conducted in the page size priority order. The linked list is updated, and the updating moves a page size associated with the lookup to a location in the linked list. A physical address that corresponds to the virtual memory address is returned.

A processor-implemented method for address translation comprising: accessing a processor core, wherein the processor core includes a memory management unit (MMU) and a unified translation lookaside buffer (TLB) within the MMU, wherein the TLB is configured to support a plurality of page sizes, and wherein the processor core is coupled to an external memory system; receiving, by the TLB, a lookup request for a virtual memory address, wherein the virtual memory address corresponds to a process running on the processor core; accessing, by the TLB, a linked list, wherein the linked list comprises a page size priority order for the plurality of page sizes; performing a lookup, in the TLB, on the virtual memory address, wherein the lookup is conducted in the page size priority order; updating the linked list, wherein the updating moves, to a location within the linked list, an element of the linked list that corresponds to a page size; and returning a physical address corresponding to the virtual memory address. In embodiments, updating the linked list further comprises counting a lookup of a page size within the plurality of page sizes. Some embodiments comprise preventing the updating of the linked list until a number of accesses for the page size exceeds a threshold. And in embodiments, the threshold is stored in a software-updatable configuration register.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
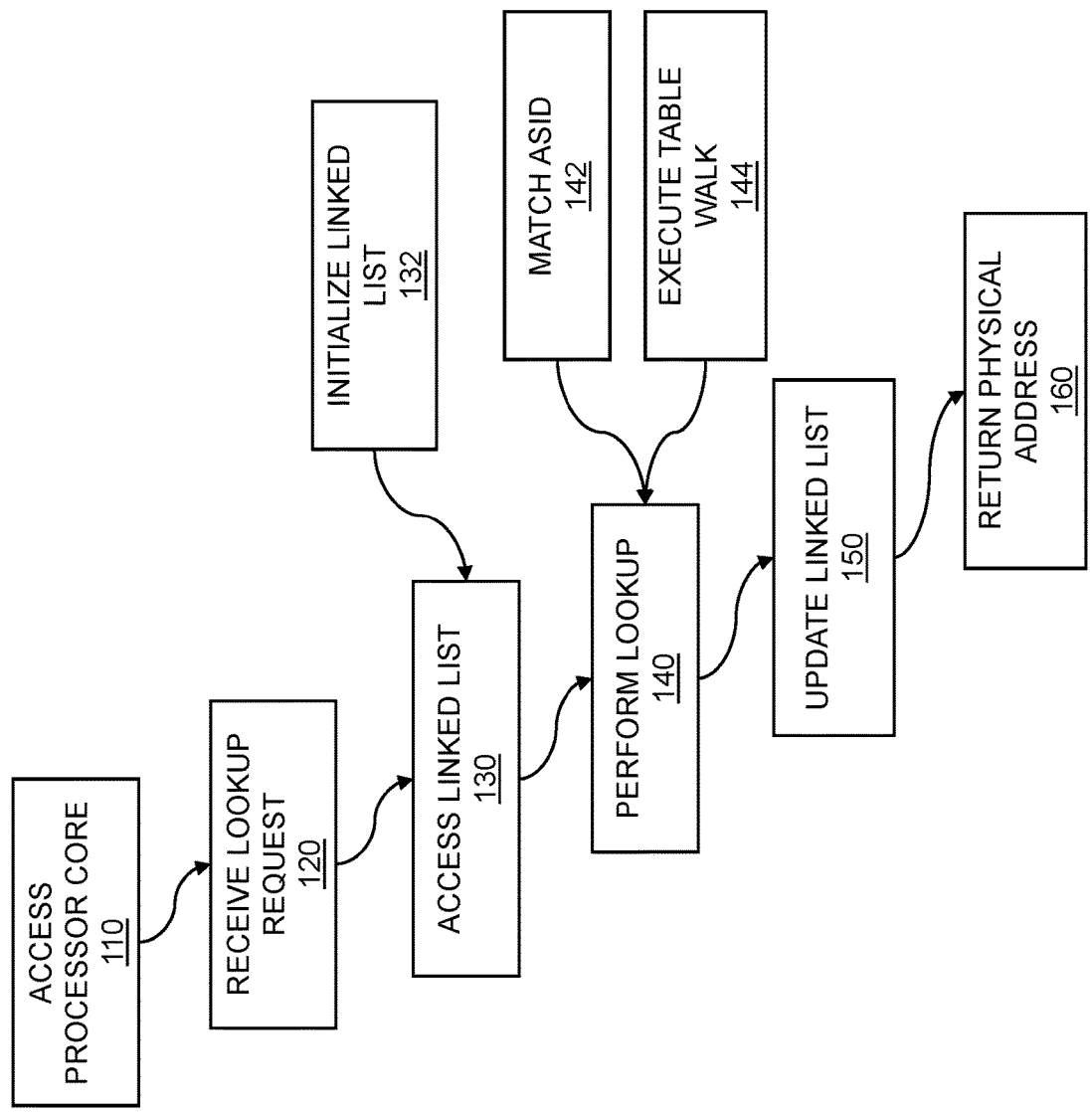
FIG. 1 is a flow diagram for prioritized unified TLB lookup with variable page sizes.

Memory is one of the most important elements in a computer system. Virtual memory provides some key advantages for handling memory usage of computer processes and applications. First, virtual memory provides protection against memory corruption by giving each application its own virtual memory space. Additionally, it enables relocation of portions of code, reducing the adverse effects of memory fragmentation. Another benefit of virtual memory is that it supports the use of secondary storage for temporary preservation of memory, reducing the likelihood of an application running out of memory contents. Virtual memory accomplishes this by mapping virtual memory addresses to physical memory addresses. To map virtual memory addresses to physical memory addresses, page tables are used. A page table consists of numerous page table entries (PTEs). Each memory page in a PTE contains data structures that include mappings of virtual memory to physical memory. In practice, executing memory translations for every possible word, or virtual memory page, into a physical memory address is not feasible, as this could potentially involve accessing billions of PTEs. To make memory translations more efficient, page tables are used to group chunks of memory addresses in one mapping. As an example, a 4-kilobyte page table can represent 4 kilobytes of address translations with a single PTE.

Virtual memory is supported using both hardware and software. It maps memory addresses used by a program, called virtual addresses, into physical addresses in computer memory. Memory references within a process are logical addresses within a virtual address space for a given program or thread of execution that are dynamically translated into physical addresses at run time. This address translation enables a process/application to be swapped in and out of the main memory such that it occupies different places in the main memory at different times during the course of execution. With a virtual memory system, the memory for code and/or data of a given application need not be continuously located in the main memory during execution.

To support virtual memory, the memory may be organized into pages, where each page refers to a range of memory addresses. Pages can be swapped in and out of main memory. If the processor tries to refer to a page that is currently not available in the main memory, it generates an interrupt indicating a page fault. The operating system (OS) puts the interrupted process in a blocking state. To resume execution, the OS loads the required page into the memory. The OS will search for the required page in the virtual (logical) address space. The required page will be brought from logical address space to physical address space. The page replacement algorithms are used for the decision making of replacing the page in physical address space. The page table is updated accordingly. A signal is sent to the processor to resume the program execution. Since execution of programs on a processor involves millions of memory accesses per second, speeding up memory access is an important strategy for increased computing performance.

The page tables are managed by a Memory Management Unit (MMU) within a processor. Each physical memory reference is passed through the MMU. The MMU enables the translation between virtual memory addresses and physical memory addresses. However, accessing PTEs in main memory is time consuming, considering how often memory is accessed during execution of programs. To help improve performance, a Translation Lookaside Buffer (TLB) is used to accelerate the process. The TLB acts as a cache for the MMU that is used to reduce the time taken to access physical memory. The TLB is a part of the MMU. The TLB stores recent memory translations of virtual addresses to physical addresses. It serves as a cache for page tables. Because it is part of the MMU internal to the processor, accessing memory that is referenced in the TLB is faster than having to access the page tables in the main memory.

Virtual memory addresses include a virtual page number and an offset. The offset describes the memory location within the physical memory page. The virtual page number needs to be mapped to a physical page number. The MMU first checks the TLB to see if an entry exists. If so, it is a TLB hit, and the physical page number is retrieved from the TLB. If no entry exists in the TLB, it is a TLB miss, and the PTE must be accessed from main memory. Accessing memory via a PTE that is stored within the TLB (a TLB hit) can be more than ten times faster than cases where the PTE has to be accessed from main memory (a TLB miss).

One of the key elements of a virtual memory system is the page table size. The page table size selection is a tradeoff between various factors. A smaller page table size provides more granularity to address issues such as memory fragmentation, but also increases the number of page tables, and can increase the number of TLB misses that occur. A larger page table size enables a smaller number of page tables, and can increase the number of TLB hits that occur, but offers less granularity for combating memory fragmentation.

Techniques for address translation are disclosed. Embodiments mitigate the aforementioned problems by supporting multiple page sizes with page tables that are organized by a dynamic linked list. Programs and applications can utilize a page table that is well suited for given operations. For example, applications that tend to operate on large contiguous data structures can receive the benefits of using a larger page size, while applications that tend to operate on smaller chunks of memory can receive the benefits of using a smaller page size. The priority of the page tables can be adjusted dynamically based on program execution. In this way, disclosed embodiments support multiple page sizes with dynamic priority, allowing the benefits of the various page table sizes while improving address translation performance, thereby improving overall processor performance.

FIG. 1 is a flow diagram 100 for prioritized unified TLB lookup with variable page sizes. The flow includes accessing a processor core 110. The processor core can be a Reduced Instruction Set Computer (RISC) core. The processor core may support instructions that can be executed in a pipelined manner, having pipeline stages that may include fetch, decode, and execute. Each of these pipeline stages may take one clock cycle, and thus, the pipelined operation can allow RISC processors to operate on more than one instruction per clock cycle. In embodiments, the processor core can include a RISC-V processor, ARM processor, MIPS processor, or other suitable RISC processor type. The flow includes receiving a lookup request 120. The lookup request can include a request to obtain a physical address corresponding to a given virtual address. The flow can include accessing a linked list 130. The linked list can be implemented as a linear data structure, in which the elements of the linked list are each referenced to multiple page tables and each page table of the multiple page tables has a different page size. Embodiments can include initializing the linked list 132. In embodiments, the linked list is initialized with an order from a smallest to a largest page size. In other embodiments, the linked list is initialized with an order stored in a software-updatable configuration register. Thus, different initialization orders can be used. The order can include moving from a largest page size to a smallest page size. Other orders can be used in disclosed embodiments. The flow includes performing a lookup 140. The lookup includes attempting to find a page table entry in a TLB. If the page table entry exists in the TLB, the physical page number corresponding to a given virtual page number is retrieved from the TLB entry, saving multiple clock cycles, and enabling the memory access to occur in a reduced amount of time as compared with accessing main memory to obtain a page table entry (PTE). In the scenario where a corresponding entry in the TLB is not found, the flow includes executing a table walk 144. The table walk 144 can include accessing a page table entry (PTE) from a page table located in main memory. The main memory can include dynamic random-access memory (DRAM) that is coupled to the processor via a memory bus. The flow can include matching an Address Space Identifier (ASID) 142. In embodiments, a unique ASID is assigned to each process executing on the processor. The ASID can be used as part of the matching criteria for entries in the TLB. In this way, multiple programs, each with their own virtual address space, can share a unified TLB. If two programs happen to use the same virtual page number, the unique ASIDs among executing processes prevents memory corruption of one process by another.

In embodiments, the ASID can be assigned by an operating system executing on the processor. In some embodiments, the ASID can be assigned by the processor itself and stored in system registers as part of a per-thread architectural state. In some embodiments, the ASID may range from 12 to 16 bits in length. In some embodiments, the ASID may be assigned to a process or thread in a sequential manner. In some embodiments, the ASID may roll over once the ASID value reaches its maximum. The ASID may be a hashed value derived from a program fingerprint. The program fingerprint can include a size of a program, a date of creation for a program, and/or other metadata. In some embodiments, the program fingerprint can also include a random element, such as a processor counter and/or time-of-day clock to enable randomness in the ASID such that the ASID is an unpredictable value that changes each time an application is executed for improved security. In embodiments, each process of a plurality of processes running on the processor core is assigned a unique ASID. Embodiments can support a special ASID value to enable shared memory regions between two processes. As an example, an ASID value of 0xFFFF can signify a memory page that is shared by multiple applications.

Once a page table entry (PTE) is found in the TLB or in main memory, the flow can include updating the linked list 150. The updating can include changing the order of the linked list based on the page size of the most recently accessed page table. In embodiments, the page tables are searched in the order set in the linked list. Thus, disclosed embodiments take advantage of temporal and/or memory locality to promote recently used page tables such that they are searched first. In this way, in the event of a TLB miss, disclosed embodiments can provide improved memory access performance while still supporting multiple page tables that have different page sizes. The flow continues with returning a physical address 160. The physical address provides a location within main memory that corresponds to the virtual address that was included in the lookup request received at 120.

Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
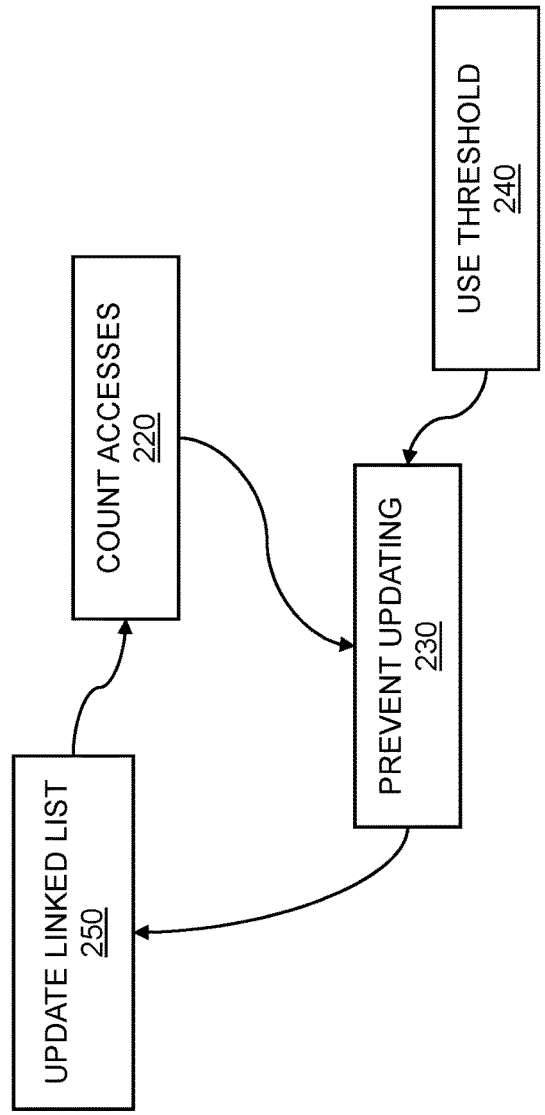
FIG. 2 is a flow diagram for updating a linked list.

FIG. 2 is a flow diagram 200 for updating a linked list. The flow includes counting accesses 220. In embodiments, updating the linked list further comprises counting a lookup of a page size within the plurality of page sizes. In some embodiments, the linked list is updated only after a certain number of accesses to a given page table. The flow can include using a threshold 240. In embodiments, the threshold is stored in a software-updatable configuration register. In some embodiments, the threshold can be a value of one. In other embodiments, the threshold can be a value greater than one. In some embodiments, the value of the threshold can be in the range of two to ten. The flow can include preventing updating of the linked list 230 unless a number of accesses exceeds the threshold. In some embodiments, the threshold specifies a number of consecutive memory accesses corresponding to a given page table. The threshold enables fine tuning of the linked list based on the types of applications that are concurrently executing on a processor. Thus, embodiments can include preventing the updating of the linked list until a number of accesses for the page size exceeds a threshold. Once the threshold condition is satisfied, the flow continues to update the linked list 250. The updating can include altering the order of the elements of the linked list, where each element of the linked list corresponds to a page table, and each page table has different sized pages. Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors.

Figure 3:
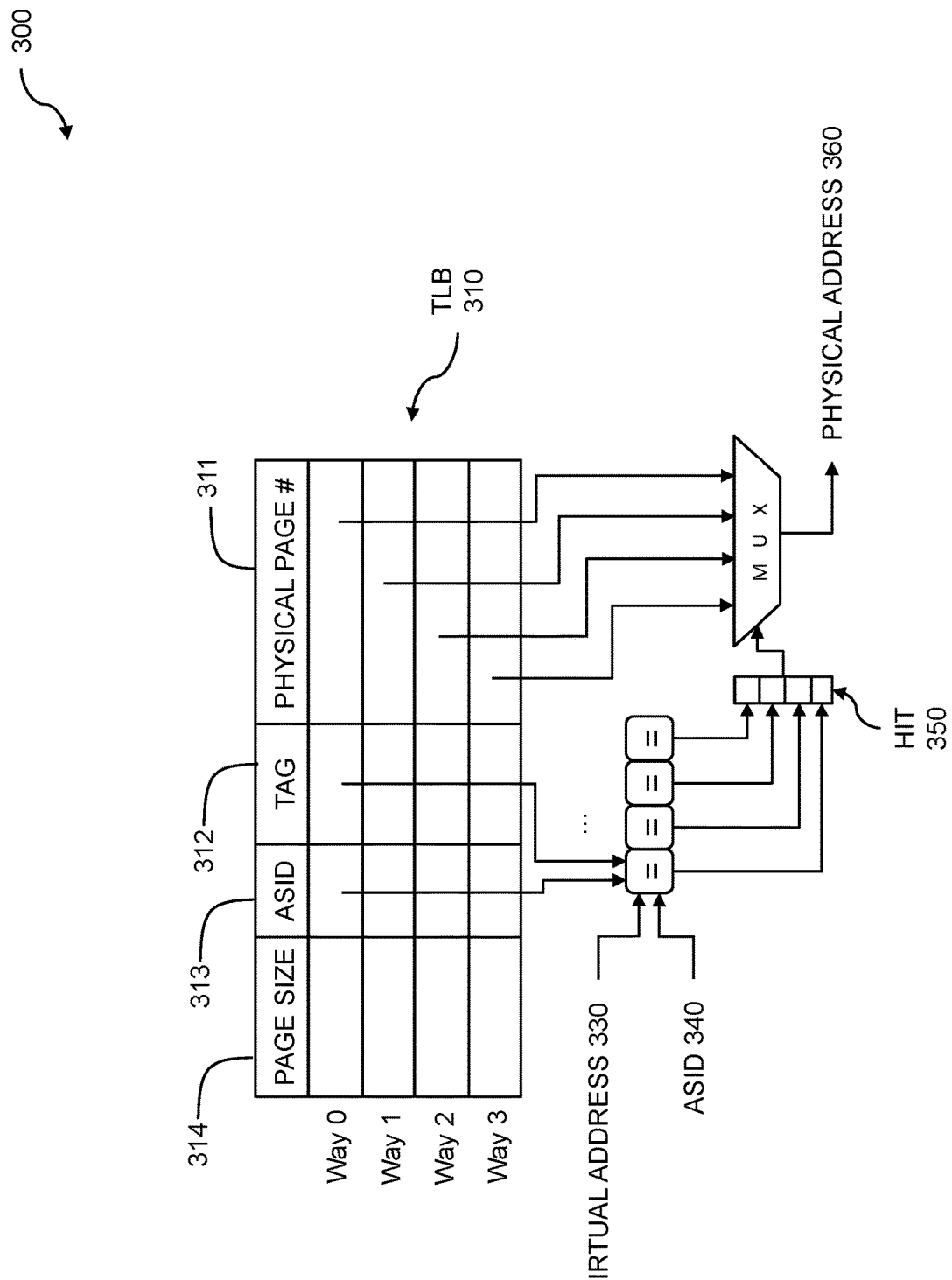
FIG. 3 is a block diagram for generating a physical address with a 4-way set associative TLB.

FIG. 3 is a block diagram 300 for generating a physical address with a 4-way set associative TLB 310. The TLB 310 can include various fields. The fields can include a physical page number field 311. The fields can include a tag field 312. The tag field can store a corresponding virtual page number for a given physical page number in field 311. The fields can include an ASID field 313. Thus, in embodiments, the TLB includes an Address Space Identifier (ASID) stored with a TLB entry. The fields can further include a page size field 314. The page size field can include a bit or value indicative of the page size of the page table that corresponds to a given entry in the TLB 310. Because the TLB can support multiple page sizes, any TLB miss requires a table walk of the page table associated with each page size until a match is found to translate a virtual address into a physical address. In embodiments, the TLB comprises a 2-way, 4-way or an 8-way set associative cache. In embodiments, the TLB includes multiple ways and an index checks entries in each of the ways of the TLB. An incoming virtual address 330 and a corresponding ASID 340 associated with the incoming virtual address 330 are used as criteria to identify a matching entry in the TLB 310. In embodiments, a lookup further comprises matching the unique ASID with an ASID stored within the TLB entry. Thus, when an entry that matches both the ASID and the tag is found in the TLB 310, it is registered as a TLB hit 350 via the associated digital logic shown in FIG. 3, to produce an output physical address 360. In embodiments, a tag controls which of the ways of the TLB is selected.

Figure 4:
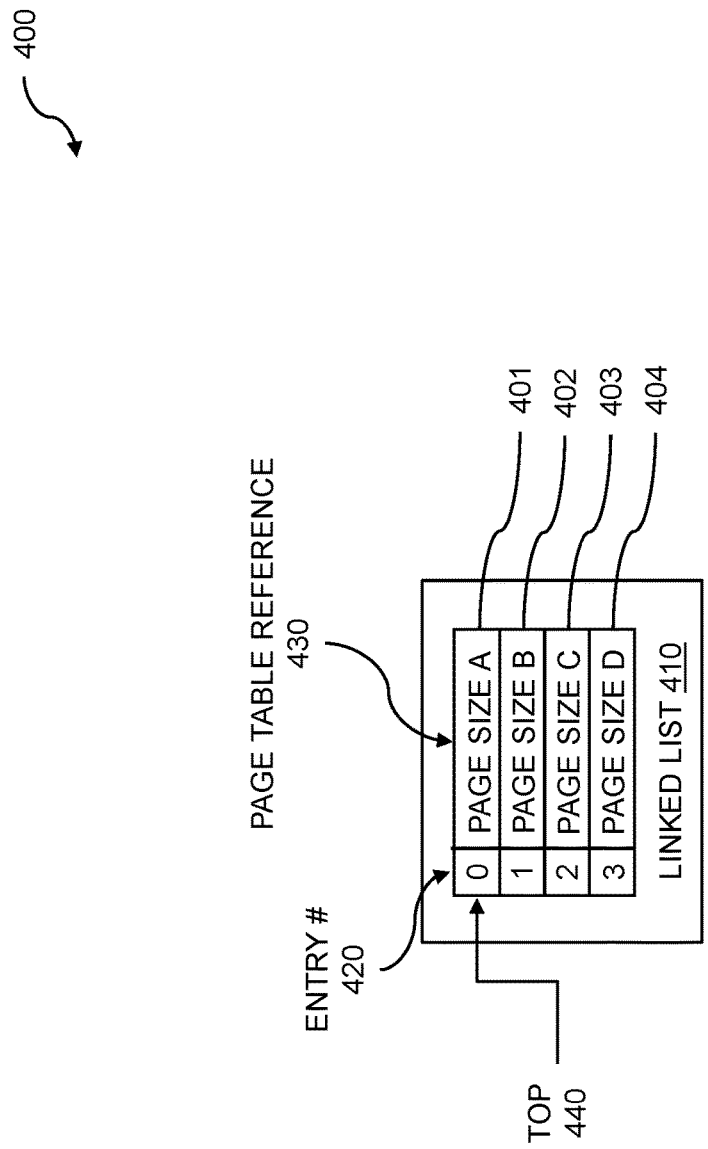
FIG. 4 is a block diagram for a linked list.

FIG. 4 is a block diagram 400 for a linked list 410. The linked list 410 includes four elements, indicated as rows 401, 402, 403, and 404. Within each row, there is an entry number field 420 and a page table reference field 430. Each page table reference in the page table reference field 430 represents a different page size: A, B, C, or D. The top 440 of the linked list is entry 0, which corresponds to the element of row 401, having a page size of A. The order of the elements in the list is determined by the entry number associated with that element. Page size A is the first element with an entry number of 0. The next element is page size B, with an entry number of 1. The next element is page size C, with an entry number of 2. The final element is page size D with an entry number of 3. Hence, the current page size order for the linked list 410 as shown is: A, B, C, D. This order can change dynamically based on program execution. In embodiments, the linked list comprises a number of entries corresponding to the plurality of page sizes. In embodiments, the plurality of page sizes includes a four kilobyte page size, a two megabyte page size, a one gigabyte page size, and a 512 gigabyte page size. In embodiments, page size A is 4 KB, page size B is 2 MB, page size C is 1 GB, and page size D is 512 GB. Other page sizes are possible in disclosed embodiments. Furthermore, while linked list 410 comprises four elements (401-404), other embodiments may have more or fewer elements included in a linked list. In embodiments, the linked list 410 is stored within a software-updatable configuration register array. The software-updatable configuration register array can be programmed by machine instructions. The machine instructions may populate the software-updatable configuration register array based on recent page table accesses and/or TLB accesses. The machine instructions may modify the next pointer field dynamically to reorder the linked list based on recent page table accesses and/or TLB accesses.

Figure 5:
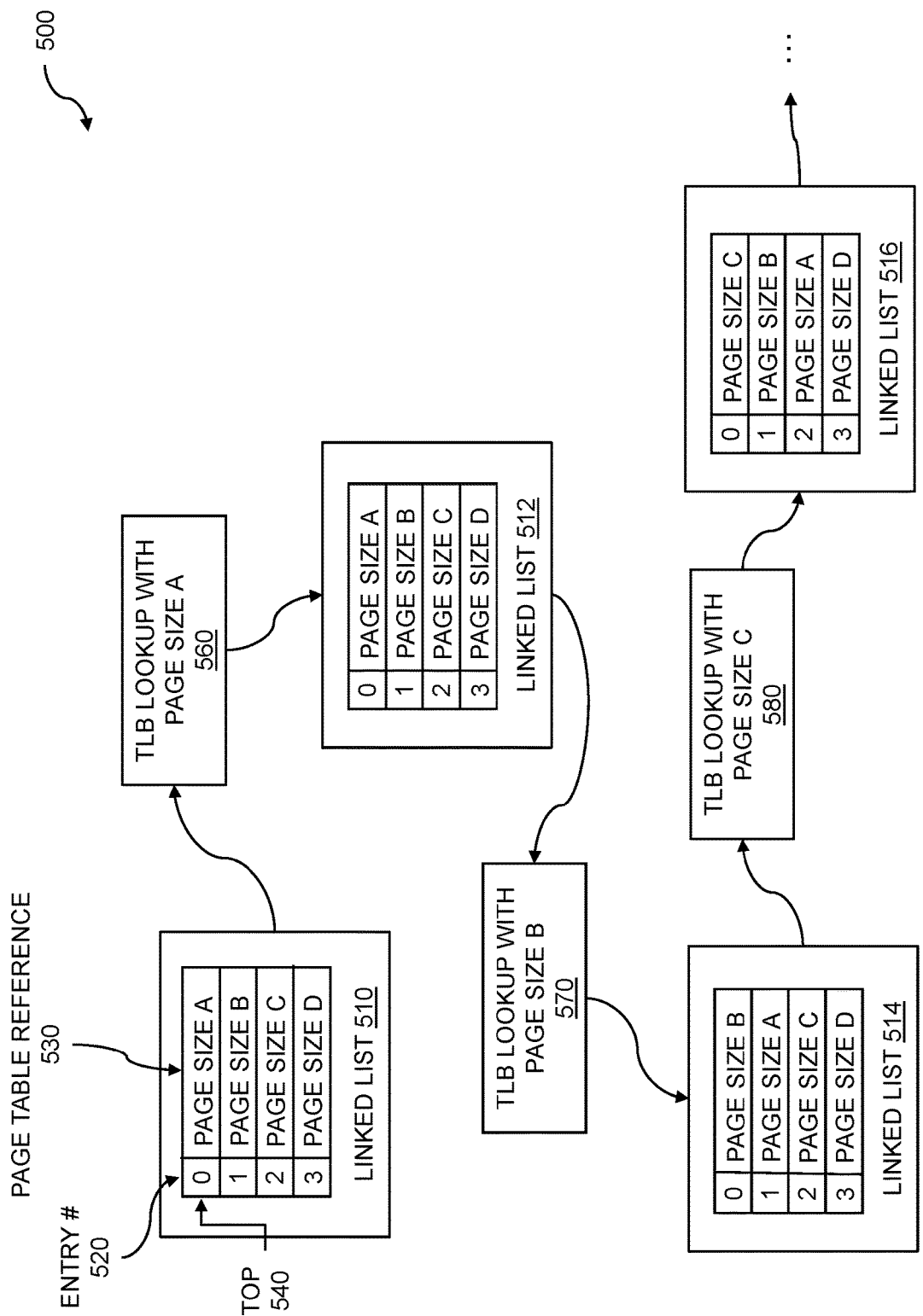
FIG. 5 is a block diagram for updating a linked list.

FIG. 5 is a block diagram 500 for updating a linked list. The linked list 510 includes four elements. Within each element, there is an entry number field 520 and a page table reference field 530. The top 540 of linked list 510 refers to entry 0, which corresponds to the page table with a page size of A. In the example of FIG. 5, a TLB lookup with page size A occurs at 560. Since this is at the top of the linked list 510, as indicated by 540, there is no change in the order of the linked list following 560, and thus, linked list 512 has the same order of elements as linked list 510. Continuing with the example of FIG. 5, a TLB lookup with page size B occurs at 570. The order of the elements within linked list 514 is modified such that the page table corresponding to page size B is promoted to the top of the linked list, above the other entries. Continuing with the example of FIG. 5, a TLB lookup with page size C occurs at 580. The order of the elements within linked list 516 is modified such that the page table corresponding to page size C is promoted to the top of the linked list, above the other entries. At the time of the next TLB lookup, TLB entries corresponding to page size C is searched first, since that was the page table used for the last TLB lookup at 580. This process continues as the processor performs memory access during the execution of programs. The dynamically ordered linked list of page table references can serve to improve performance by avoiding multiple long-latency page walks in memory to lookup the proper page table. Because the TLB stores entries with different page sizes, a miss in the TLB will cause a table walk for the page size associated with the lookup. Thus, if the linked list order is A, B, C, D, a hit in the TLB with page size A would avoid three table walks for page sizes B, C, and D. Similarly, a hit in the TLB with page size B would avoid two table walks for page sizes C and D.

Figure 6:
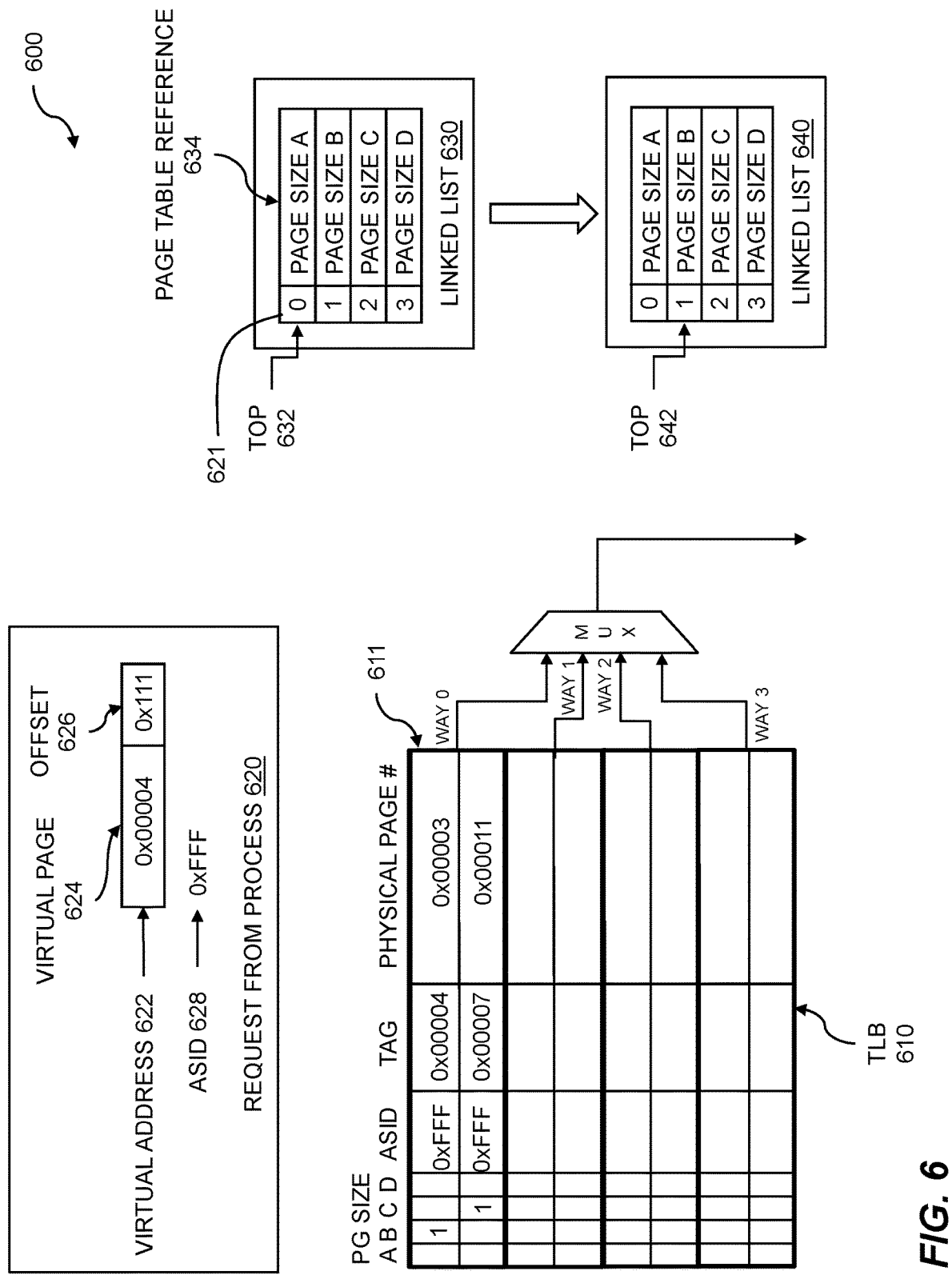
FIG. 6 is a first diagram highlighting TLB function with a linked list.

FIG. 6 is a first diagram 600 highlighting TLB function with a linked list. In embodiments, elements of FIG. 6 may be implemented within a memory management unit (MMU) of a processor. During operation, a request 620 is made from a process running on the processor core for a virtual to physical address translation. The request can include an Address Space Identifier (ASID) 628 which identifies the requesting process. The request can include a virtual address 622 to the MMU. The virtual address 622 comprises a virtual page 624 and an offset 626. The offset 626 includes the least significant bits (LSBs) of the virtual address. The virtual page 624 includes the most significant bits (MSBs) of the virtual address. When the request 620 arrives at the MMU, the linked list 630 is searched first. The linked list includes four elements. Within each element, there is an entry number field 621 and a page table reference field 634. Each page table reference in page table reference field 634 refers to a different page size. As shown, the top 632 of linked list 630 refers to entry 0, which corresponds to a page table size of A. The TLB 610 can include various fields. The fields can include a physical page number field 611. In embodiments, the fields can include an index field. The fields can include a tag field. The tag field can store a corresponding virtual page number for a given physical page number. The fields can include an ASID field. The fields can further include a page size field. The page size field can include a bit or value indicative of the page size of the page table that corresponds to a given entry in the TLB 610. In embodiments, a page size within the plurality of page sizes is stored in a TLB entry. In further embodiments, bits associated with the TLB entry vary according to the page size.

The TLB 610 can be searched for an entry that matches the virtual page 624, a page size of A, and an ASID of the process making the memory request. Since there is no entry in the TLB which matches these three conditions, the lookup request to the TLB will result in a miss and the MMU will perform a table walk on the page table in memory that has a page size of A. After the TLB lookup request is made, the linked list can be updated 640. In embodiments, the most recently searched page size is moved to the top of the list. In this case, page size A was already on the top of the list and so the update results in no change in the order of the linked list. However, the Top of the linked list 642 is moved to element 1, which now refers to page size B. Thus, page size B will be used as the page table size for the next TLB lookup, assuming the table walk is unsuccessful in translating the virtual address to a physical address.

Figure 7:
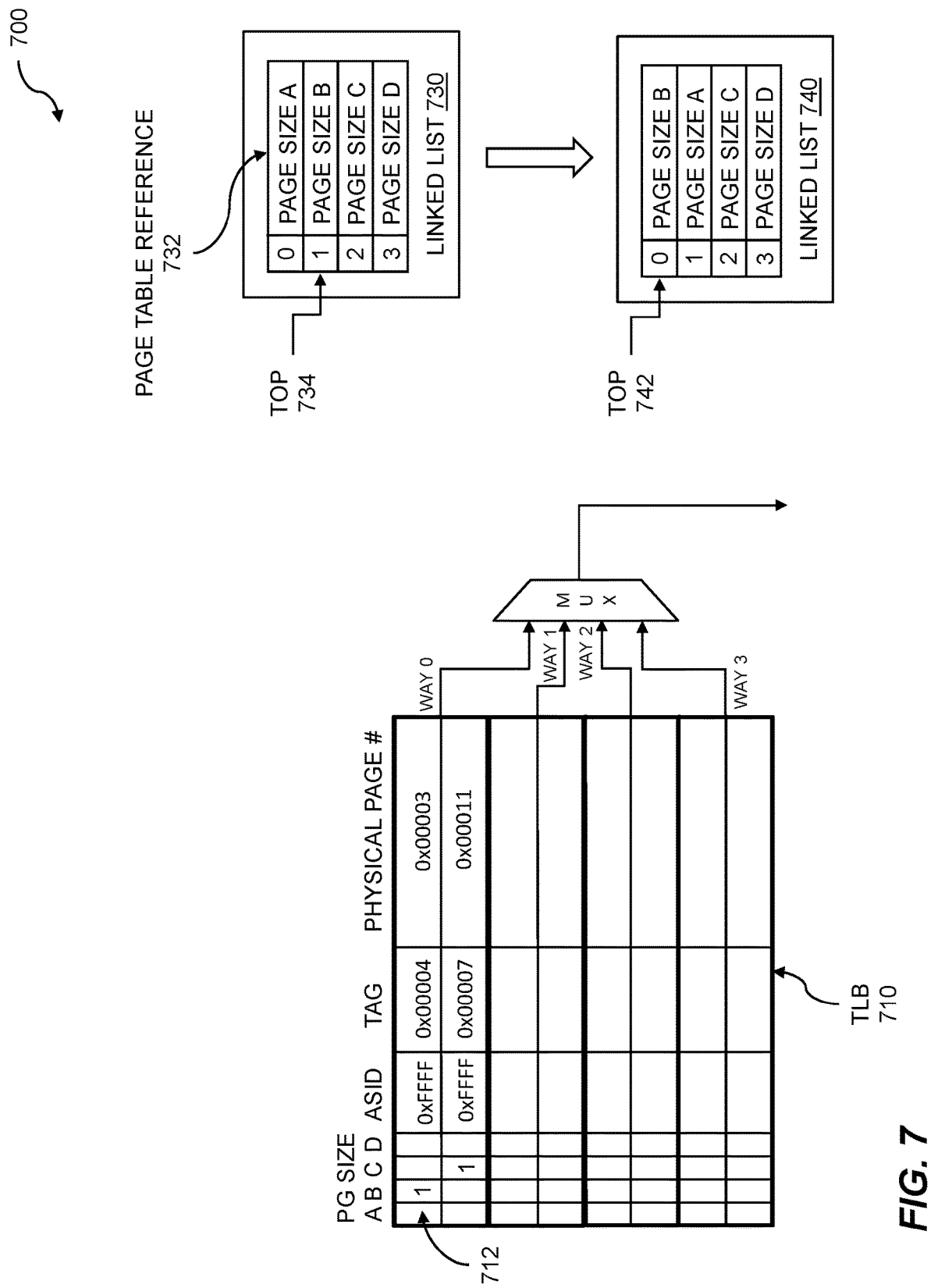
FIG. 7 is a second diagram highlighting TLB function with a linked list.

FIG. 7 is a second diagram 700 highlighting TLB function with a linked list. The figure continues from the example shown in FIG. 6, after the table walk has completed unsuccessfully. The linked list 730 can be accessed for a second time. The page table reference field 732 refers to a page table size. As shown by the Top 734, the page table size to be used for the next lookup will be page size B. The next lookup then begins by searching the TLB 710 for an entry that matches the page size from the linked list, the virtual page from the virtual address 624, and the ASID of the process making the memory request 628. Thus, in embodiments, a lookup further comprises matching the unique ASID with an ASID stored within the TLB entry. Now, the lookup to the TLB causes a hit at location 712. Because a lookup occurred, the linked list will again be updated. As shown in 740, page size B has been moved to the first entry of the linked list since that was the page size used in the last lookup. In this case, the Top 742 can be moved back to entry 0 in the linked list since a TLB hit occurred. Thus, page size B will again be used in the next TLB lookup. In embodiments, the updating moves the page size associated with the lookup to a top of the linked list. In embodiments, the updating occurs on a TLB hit or miss. Because no further lookups are required for virtual address 622, a significant performance improvement can be realized. This is because potential table walks of page tables for page sizes C and D are no longer required to locate the proper virtual to physical address mapping.

Figure 8:
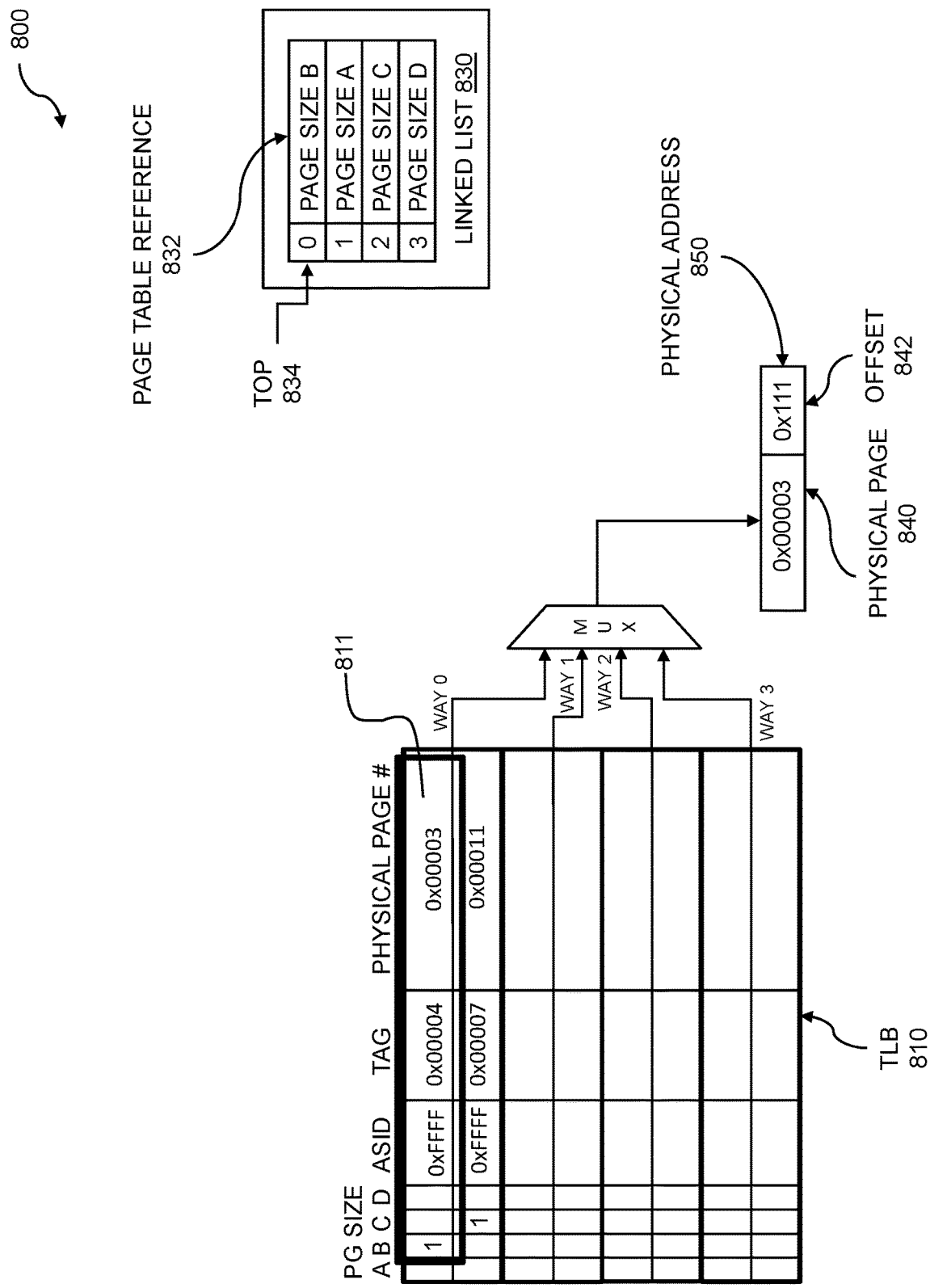
FIG. 8 is a third diagram highlighting TLB function with a linked list.

FIG. 8 is a third diagram 800 highlighting TLB function with a linked list. Continuing from the example shown in FIG. 7, the physical page in row 811 of TLB 810 is loaded into the physical page 840, and combined with offset 842 to form physical address 850. Note that in some embodiments, the processes indicated in FIG. 7 and FIG. 8 may occur in a different order than shown in FIG. 6-8, or may occur concurrently. Regardless of the sequence, the linked list 830 is updated such that the element ordering reflects the most recently referenced page size, or the page table corresponding to the most recent TLB hit. The page table reference field 832 refers to a page table size. The example of FIGS. 6-8 illustrate a TLB hit, and as can be seen in linked list 830, the order is changed such that the page table corresponding to page size B within the page table reference is at the top, as indicated by 834. The next time there is a TLB lookup, the page size corresponding to page size B is searched first, followed by the page size corresponding to page size A, the page size corresponding to page size C, and the page size corresponding to page size D.

Figure 9A:
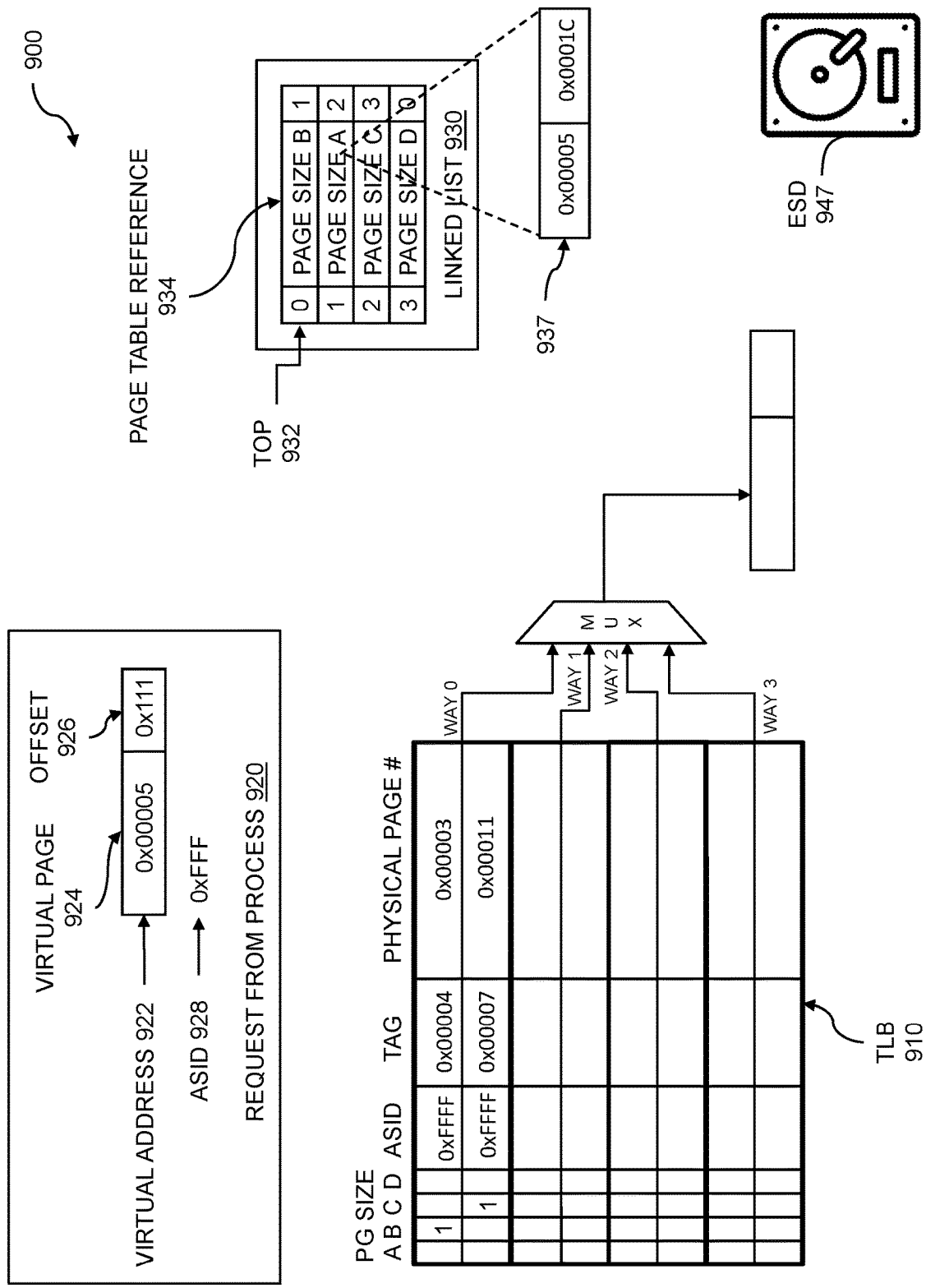
FIG. 9A is a diagram illustrating a TLB miss with a linked list.

FIG. 9A is a diagram 900 illustrating a TLB miss with a linked list. During operation, a request 920 from a process running on the processor core is presented to the MMU. The request includes a virtual address 922 for translation. The virtual address 922 comprises a virtual page 924 and an offset 926. The request also includes the ASID 928 of the requesting process. The offset 926 includes the least significant bits (LSBs) of the virtual address. The virtual page 924 includes the most significant bits (MSBs) of the virtual address. The value of the virtual page 924 in the example of FIG. 9A is 0x00005. The page table reference field 934 refers to a page table size. When the request is presented, the linked list 930 is accessed which indicates that a search for a match in page size B is to be performed first, as indicated by Top at 932. A TLB lookup then occurs, but the virtual page value is not present as a tag in TLB 910, and results in a TLB miss. Thus, a table walk on page size B must be performed. However, the corresponding entry is not found in that page table. Next, again referencing the linked list, a search for a match in page size A is to be performed. Again, this results in a TLB miss since the virtual page 924 does not match any tag entry within the TLB. Thus, a page table walk is performed on the page table corresponding to page size A and there, the corresponding entry is found, and is illustrated as 937. In embodiments, the table walk includes a page fault if a page table is not found in a memory. Thus, if the page table entry indicates that the desired page is not in main memory, then a page fault occurs, and the data is retrieved from an external storage device (ESD) 947. In embodiments, ESD 947 can include a hard disk, solid state disk, flash memory, nonvolatile memory, and/or other suitable external storage. In embodiments, the performing a lookup further comprises executing a table walk, wherein the virtual memory address is missed in the TLB. In embodiments, the table walk includes a multi-level page table. In embodiments, the page table is retrieved from an external storage device.

Figure 9B:
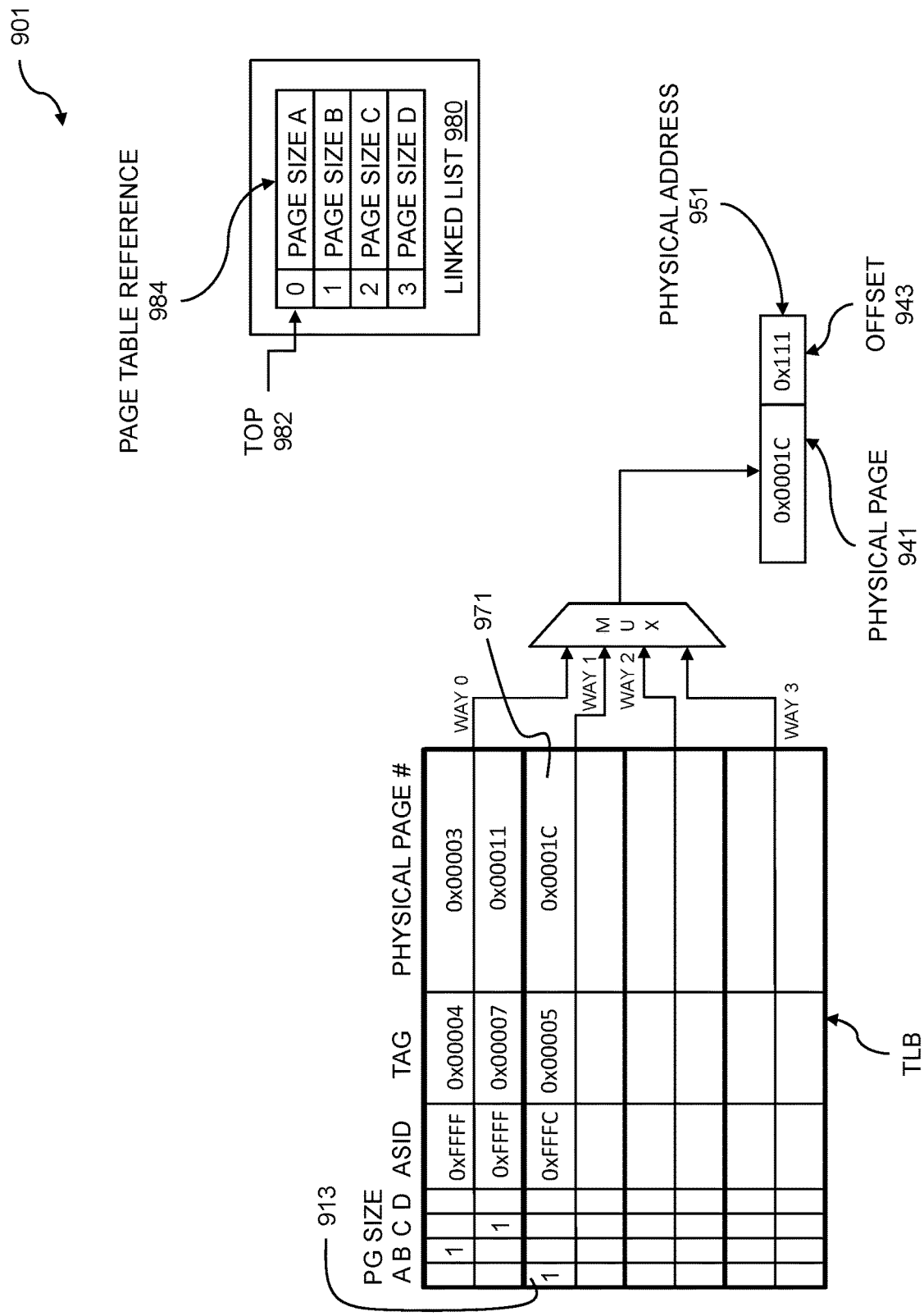
FIG. 9B is a diagram illustrating a TLB miss with physical address resolution.

FIG. 9B is a diagram 901 illustrating a TLB miss with physical address resolution. As shown in FIG. 9B, the physical page value from 937 of FIG. 9A is loaded into the physical page 941, and combined with offset 943, which is identical to the offset 926 of FIG. 9A of the incoming virtual address request 920 of FIG. 9A, to form the physical address 951. The corresponding virtual page and physical page are loaded into TLB 973, indicated by row 971. A bit 913 is asserted, corresponding to page size A. Furthermore, linked list 980 has its elements reordered as compared with linked list 930 of FIG. 9A. Since the most recent page table access corresponded to the page table of size A, the linked list 980 is reordered so that the first element within the page table reference field 984, indicated by top 982, refers to the page table of page size A, which is the size of the page table used to obtain the TLB entry at row 971, as indicated in linked list 930 in FIG. 9A. Thus, whether there is a TLB hit or a TLB miss, the linked list can be updated when a TLB lookup is performed.

Figure 10:
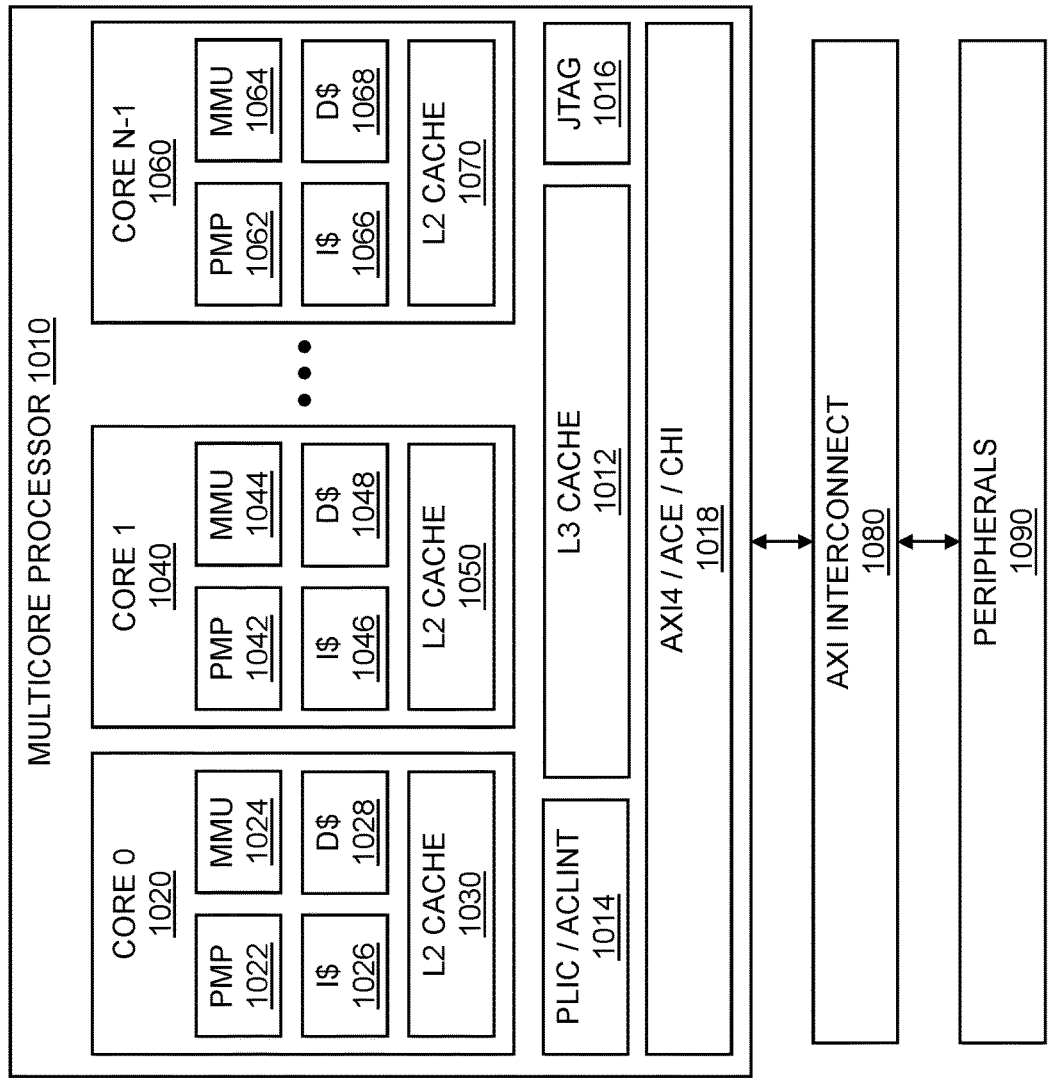
FIG. 10 is a multicore processor.

FIG. 10 is a diagram 1000 of a multicore processor 1010 that supports address translation. In embodiments, the multicore processor can be a RISC-V™ processor, ARM™ processor, MIPS™ processor, or other suitable processor type. The processor can include a multi-core processor, where two or more processor cores can be included. The processor, such as a RISC-V™ processor, can include a variety of elements. The elements can include processor cores, one or more caches, memory protection and management units, local storage, and so on. The elements of the multicore processor can further include one or more of a private cache, a test interface such as a joint test action group (JTAG) test interface, one or more interfaces to a network such as a network-on-chip, shared memory, peripherals, and the like. The multicore processor is enabled by processor and network-on-chip coherency management. A plurality of processor cores is accessed. Each processor of the plurality of processor cores can perform address translation using a unified TLB and a linked list referring to multiple page tables, where each page table of the multiple page tables has a different page size.

The block diagram 1000 can include a multicore processor 1010. The multicore processor can comprise two or more processors, where the two or more processors can include homogeneous processors, heterogeneous processors, etc. In the block diagram, the multicore processor can include N processor cores such as core 0 1020, core 1 1040, core N−1 1060, and so on. Each processor can comprise one or more elements. In embodiments, each core, including cores 0 through core N−1, can include a physical memory protection (PMP) element, such as PMP 1022 for core 0; PMP 1042 for core 1, and PMP 1062 for core N−1. In a processor architecture such as the RISC-V™ architecture, PMP can enable processor firmware to specify one or more regions of physical memory such as cache memory of the shared memory, and to control permissions to access the regions of physical memory. The cores can include a memory management unit (MMU) such as MMU 1024 for core 0, MMU 1044 for core 1, and MMU 1064 for core N−1. The memory management units can translate virtual addresses used by software running on the cores to physical memory addresses with caches, the shared memory system, etc.

The processor cores associated with the multicore processor 1010 can include caches such as instruction caches and data caches. The caches, which can comprise level 1 (L1) caches, can include an amount of storage such as 16 KB, 32 KB, and so on. The caches can include an instruction cache I$ 1026 and a data cache D$ 1028 associated with core 0; an instruction cache I$ 1046 and a data cache D$ 1048 associated with core 1; and an instruction cache I$ 1066 and a data cache D$ 1068 associated with core N−1. In addition to the level 1 instruction and data caches, each core can include a level 2 (L2) cache. The level 2 caches can include L2 cache 1030 associated with core 0; L2 cache 1050 associated with core 1; and L2 cache 1070 associated with core N−1. The cores associated with the multicore processor 1010 can include further components or elements. The further elements can include a level 3 (L3) cache 1012. The level 3 cache, which can be larger than the level 1 instruction and data caches, and the level 2 caches associated with each core, can be shared among all of the cores. The further elements can be shared among the cores. In embodiments, the further elements can include a platform level interrupt controller (PLIC) 1014. The platform-level interrupt controller can support interrupt priorities, where the interrupt priorities can be assigned to each interrupt source. The PLIC source can be assigned a priority by writing a priority value to a memory-mapped priority register associated with the interrupt source. The PLIC can be associated with an advanced core local interrupter (ACLINT). The ACLINT can support memory-mapped devices that can provide inter-processor functionalities such as interrupt and timer functionalities. The inter-processor interrupt and timer functionalities can be provided for each processor. The further elements can include a joint test action group (JTAG) element 1016. The JTAG can provide boundary within the cores of the multicore processor. JTAG can enable fault information to a high precision. The high-precision fault information can be critical to rapid fault detection and repair.

The multicore processor 1010 can include one or more interface elements 1018. The interface elements can support standard processor interfaces such as an Advanced extensible Interface (AXI™) such as AXI4™, an ARM™ Advanced extensible Interface (AXI™) Coherence Extensions (ACE™) interface, an Advanced Microcontroller Bus Architecture (AMBA™) Coherence Hub Interface (CHI™), etc. In the block diagram 1000, the interface elements can be coupled to the interconnect. The interconnect can include a bus, a network, and so on. The interconnect can include an AXI™ interconnect 1080. In embodiments, the network can include network-on-chip functionality. The AXI™ interconnect can be used to connect memory-mapped "master" or boss devices to one or more "slave" or worker devices. In the block diagram 1000, the AXI interconnect can provide connectivity between the multicore processor 1010 and one or more peripherals 1090. The one or more peripherals can include storage devices, networking devices, and so on. The peripherals can enable communication using the AXI™ interconnect by supporting standards such as AMBA™ version 4, among other standards.

Figure 11:
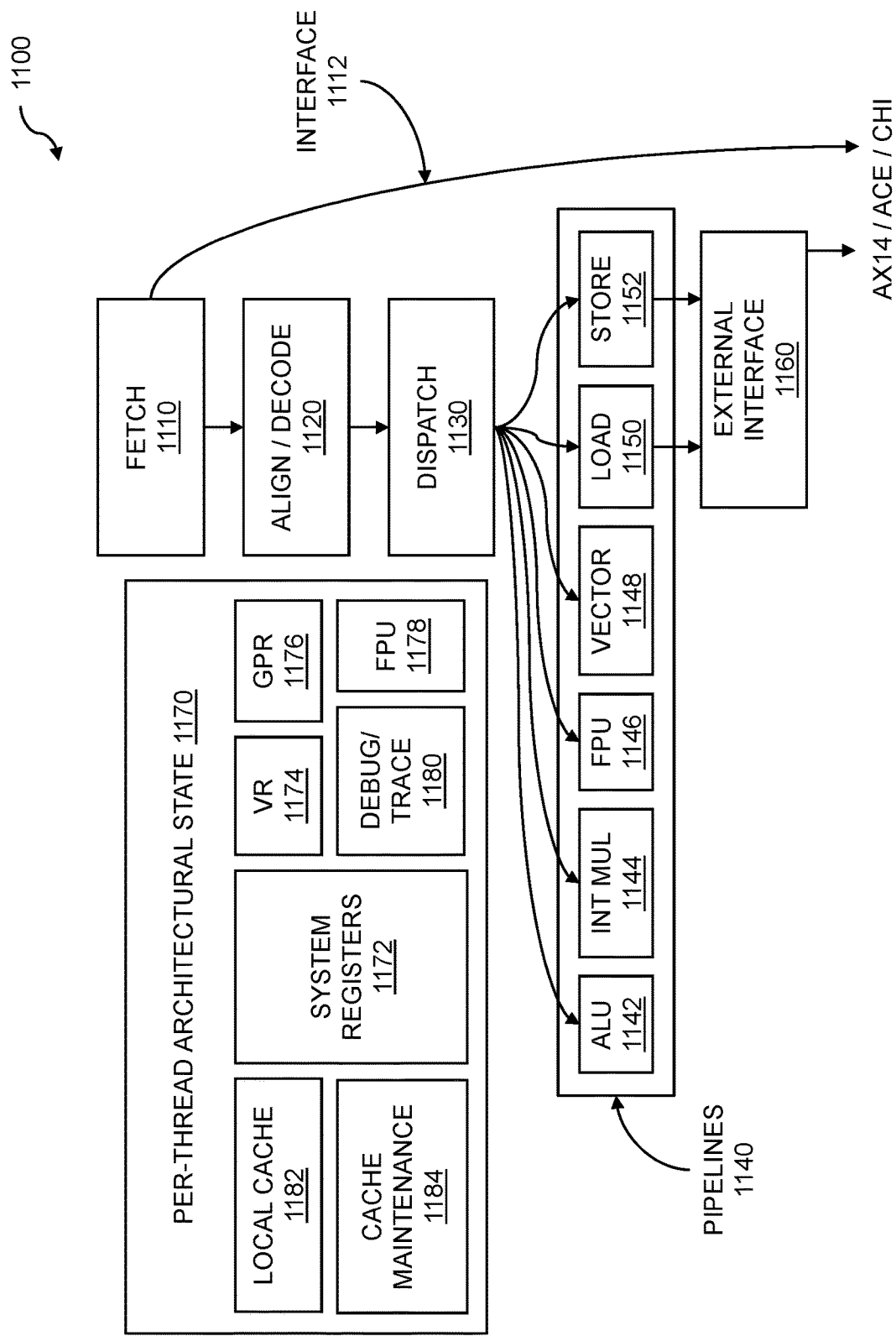
FIG. 11 is an example pipeline structure.

FIG. 11 is an example pipeline structure. The blocks within the block diagram 1100 can be configurable in order to provide varying processing levels. The varying processing levels can be based on processing speed, bit lengths, and so on. The block diagram 1100 can include a fetch block 1110. The fetch block can read a number of bytes from a cache such as an instruction cache (not shown). The number of bytes that are read can include 16 bytes, 32 bytes, 64 bytes, and so on. The fetch block can include branch prediction techniques, where the choice of branch prediction technique can enable various branch predictor configurations. The fetch block can access memory through an interface 1112. The fetch block can include, and/or interface with, address translation logic of disclosed embodiments. The interface can include a standard interface such as one or more industry standard interfaces. The interfaces can include an Advanced extensible Interface (AXI™), an ARM™ Advanced extensible Interface (AXI™) Coherence Extensions (ACE™) interface, an Advanced Microcontroller Bus Architecture (AMBA™) Coherence Hub Interface (CHI™), etc.

The block diagram 1100 includes an align and decode block 1120. Operations such as data processing operations can be provided to the align and decode block by the fetch block. The align and decode block can partition a stream of operations provided by the fetch block. The stream of operations can include operations of differing bit lengths, such as 16 bits, 32 bits, and so on. The align and decode block can partition the fetch stream data into individual operations. The operations can be decoded by the align and decode block to generate decode packets. The decode packets can be used in the pipeline to manage execution of operations. The system block diagram 1100 can include a dispatch block 1130. The dispatch block can receive decoded instruction packets from the align and decode block. In embodiments, the branch execution unit may be part of the fetch block 1110, align/decode block 1120, and/or dispatch block 1130. The decode instruction packets can be used to control a pipeline 1140, where the pipeline can include an in-order pipeline, an out-of-order (OoO) pipeline, etc. For the case of an in-order pipeline, the dispatch block can maintain a register "scoreboard" and can forward instruction packets to various processors for execution. For the case of an out-of-order pipeline, the dispatch block can perform additional operations from the instruction set. Instructions can be issued by the dispatch block to one or more execution units. A pipeline can be associated with the one or more execution units. The pipelines associated with the execution units can include processor cores, arithmetic logic unit (ALU) pipelines 1142, integer multiplier pipelines 1144, floating-point unit (FPU) pipelines 1146, vector unit (VU) pipelines 1148, and so on. The dispatch unit can further dispatch instructions to pipes that can include load pipelines 1150, and store pipelines 1152. The load pipelines and the store pipelines can access storage such as the common memory using an external interface 1160. The external interface can be based on one or more interface standards such as the Advanced extensible Interface (AXI™). Following execution of the instructions, further instructions can update the register state. Other operations can be performed based on actions that can be associated with a particular architecture. The actions that can be performed can include executing instructions to update the system register state, trigger one or more exceptions, and so on.

In embodiments, the plurality of processors can be configured to support multi-threading. The system block diagram can include a per-thread architectural state block 1170. The inclusion of the per-thread architectural state can be based on a configuration or architecture that can support multi-threading. The multi-threading support can include generation and management of an Address Space Identifier (ASID). In embodiments, thread selection logic can be included in the fetch and dispatch blocks discussed above. Further, when an architecture supports an out-of-order (OoO) pipeline, then a retire component (not shown) can also include thread selection logic. The per-thread architectural state can include system registers 1172. The system registers can be associated with individual processors, a system comprising multiple processors, and so on. The system registers can include exception and interrupt components, counters, etc. The per-thread architectural state can include further registers such as vector registers (VR) 1174, general purpose registers (GPR) 1176, and floating-point registers 1178. These registers can be used for vector operations, general purpose (e.g., integer) operations, and floating-point operations, respectively. The per-thread architectural state can include a debug and trace block 1180. The debug and trace block can enable debug and trace operations to support code development, troubleshooting, and so on. In embodiments, an external debugger can communicate with a processor through a debugging interface such as a joint test action group (JTAG) interface. The per-thread architectural state can include local cache state 1182. The architectural state can include one or more states associated with a local cache such as a local cache coupled to a grouping of two or more processors. The local cache state can include clean or dirty, zeroed, flushed, invalid, and so on. The per-thread architectural state can include a cache maintenance state 1184. The cache maintenance state can include maintenance needed, maintenance pending, and maintenance complete states, etc.

Figure 12:
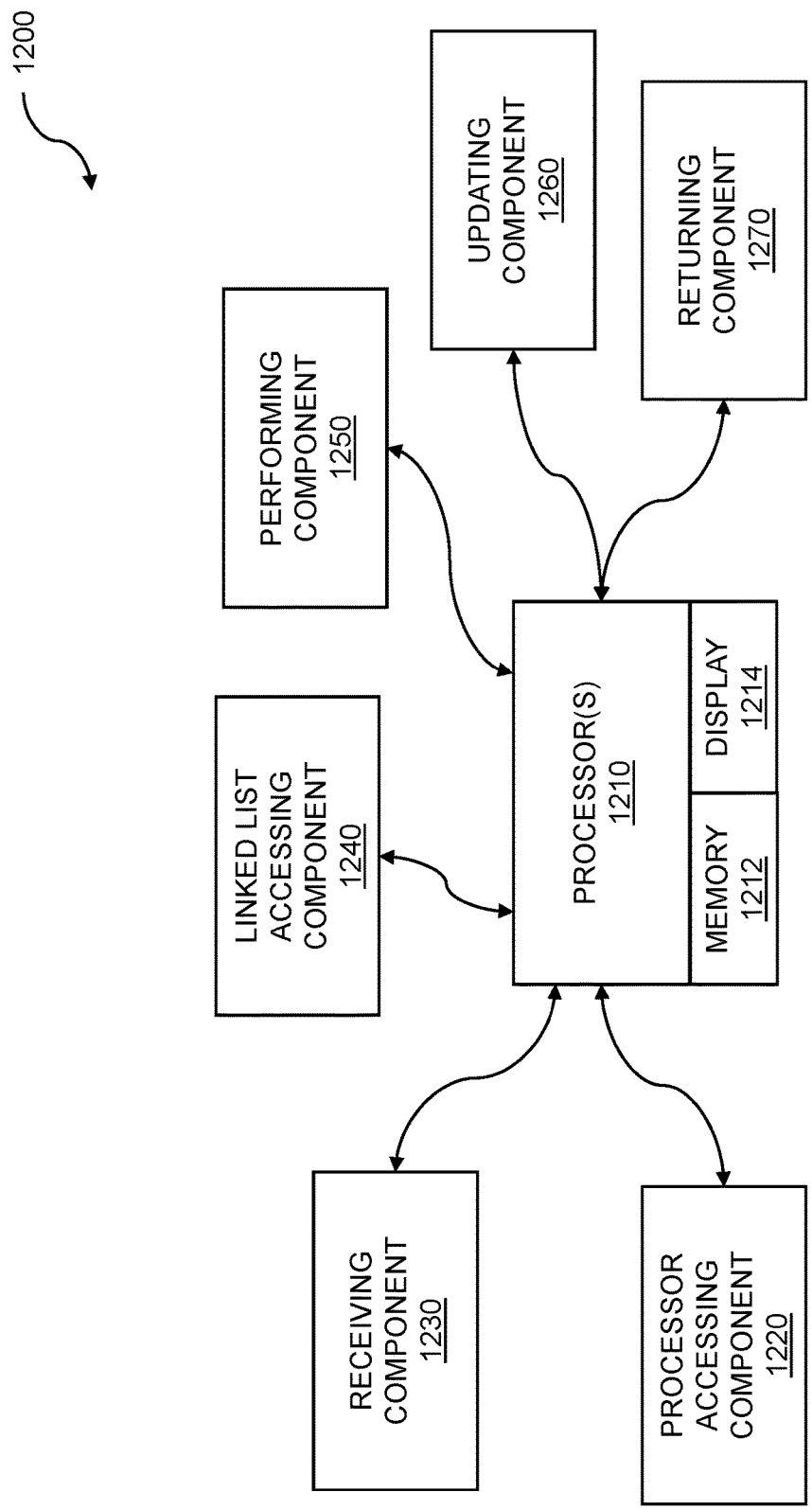
FIG. 12 is a system diagram for prioritized unified TLB lookup with variable page sizes.

FIG. 12 is a system diagram for implementing prioritized unified TLB lookup with variable page sizes. The system 1200 can include instructions and/or functions for design and implementation of integrated circuits that implement prioritized unified TLB lookup with variable page sizes. The system 1200 can include instructions and/or functions for generation and/or manipulation of design data such as hardware description language (HDL) constructs for specifying structure and operation of an integrated circuit. The system 1200 can further perform operations to generate and manipulate Register Level Transfer (RTL) abstractions. These abstractions can include parameterized inputs that enable specifying elements of a design such as a number of elements, sizes of various bit fields, and so on. The parameterized inputs can be input to a logic synthesis tool which in turn creates the semiconductor logic that includes the gate-level abstraction of the design that is used for fabrication of integrated circuit (IC) devices.

The system can include one or more of processors, memories, cache memories, displays, and so on. The system 1200 can include one or more processors 1210. The processors can include standalone processors within integrated circuits or chips, processor cores in FPGAs or ASICs, and so on. The one or more processors 1210 are coupled to a memory 1212, which stores operations. The memory can include one or more of local memory, cache memory, system memory, etc. The system 1200 can further include a display 1214 coupled to the one or more processors 1210. The display 1214 can be used for displaying data, instructions, operations, and the like. The operations can include instructions and functions for implementation of integrated circuits, including processor cores. In embodiments, the processor cores can include RISC-V™ processor cores.

The system 1200 can include a processor accessing component 1220. The processor accessing component 1220 can include functions and instructions for processing design data for accessing a processor core. The processor core can include FPGAs, ASICs, etc. In embodiments, the processor core can include a RISC-V™ processor core. The processor core is coupled to an external memory system. The external memory system can include magnetic disk drives, optical disk drives, solid-state disks, and so on. The processor core can support prioritized unified TLB lookup with variable page sizes as described previously.

The system 1200 can include a receiving component 1230. The receiving component 1230 can include functions and instructions for processing design data for receiving, by the TLB, a lookup request for a virtual memory address, wherein the virtual memory address corresponds to a process running on the processor core, to implement a processor core that can support prioritized unified TLB lookup with variable page sizes as described previously. The virtual memory address can include an offset and a virtual page number. In some embodiments, additional information may be included with the request, including, but not limited to, an Address Space Identifier (ASID) to support memory protection with multiple concurrently executing processes and/or threads.

The system 1200 can include a linked list accessing component 1240. The linked list accessing component 1240 can include functions and instructions for processing design data for accessing, by the TLB, a linked list, wherein the linked list comprises a page size priority order for the plurality of page sizes, to implement a processor core that can support prioritized unified TLB lookup with variable page sizes as described previously. The linked list can include multiple elements, where each element is associated with a different page table, and each of the page tables can have a different page size. In some embodiments, the different page sizes include 4 kilobyte (4 KB), 2 megabyte (2 MB), 1 gigabyte (1 GB), and 512 gigabyte (512 GB).

The system 1200 can include a performing component 1250. The performing component 1250 can include functions and instructions for processing design data for performing a lookup, in the TLB, on the virtual memory address, wherein the lookup is conducted in the page size priority order, to implement a processor core that can support prioritized unified TLB lookup with variable page sizes as described previously. The priority order is based on recent memory accesses. In embodiments, regardless of whether the recent memory accesses were TLB hits or TLB misses, the priority order is updated to prioritize the page table associated with recent memory accesses. In this way, subsequent TLB misses search through the plurality of page tables in a prioritized order, to enable improved memory access times, thereby improving overall processor performance.

The system 1200 can include an updating component 1260. The updating component 1260 can include functions and instructions for processing design data for updating the linked list, wherein the updating moves, to a location within the linked list, an element of the linked list that corresponds to a page size, to implement a processor core that can support prioritized unified TLB lookup with variable page sizes as described previously. The moving can include moving an element from one location in the linked list to another location in the linked list. The moving can include moving all the elements of the linked list in terms of the order in which they will be searched. This can be done dynamically based on recent memory accesses. In embodiments, the updating is performed by updating one or more registers in a software-updatable configuration register array. The system 1200 can include a returning component 1270. The returning component 1270 can include functions and instructions for processing design data for returning a physical address. The physical address provides a location within main memory that corresponds to the virtual address that was included in the received lookup request.

The system 1200 can include a computer program product embodied in a non-transitory computer readable medium for address translation, the computer program product comprising code which causes one or more processors to generate semiconductor logic for: accessing a processor core, wherein the processor core includes a memory management unit (MMU) and a unified translation lookaside buffer (TLB) within the MMU, wherein the TLB is configured to support a plurality of page sizes, and wherein the processor core is coupled to an external memory system; receiving, by the TLB, a lookup request for a virtual memory address, wherein the virtual memory address corresponds to a process running on the processor core; accessing, by the TLB, a linked list, wherein the linked list comprises a page size priority order for the plurality of page sizes; performing a lookup, in the TLB, on the virtual memory address, wherein the lookup is conducted in the page size priority order; updating the linked list, wherein the updating moves, to a location within the linked list, an element of the linked list that corresponds to a page size; and returning a physical address corresponding to the virtual memory address.

The system 1200 can be used to create an apparatus for address translation comprising: a processor core coupled to a memory wherein the processor core and the memory are used to perform operations comprising: accessing a processor core, wherein the processor core includes a memory management unit (MMU) and a unified translation lookaside buffer (TLB) within the MMU, wherein the TLB is configured to support a plurality of page sizes, and wherein the processor core is coupled to an external memory system; receiving, by the TLB, a lookup request for a virtual memory address, wherein the virtual memory address corresponds to a process running on the processor core; accessing, by the TLB, a linked list, wherein the linked list comprises a page size priority order for the plurality of page sizes; performing a lookup, in the TLB, on the virtual memory address, wherein the lookup is conducted in the page size priority order; updating the linked list, wherein the updating moves, to a location within the linked list, an element of the linked list that corresponds to a page size; and returning a physical address corresponding to the virtual memory address.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods and/or processor-implemented methods. Any and all such functions-generally referred to herein as a "circuit," "module," or "system"—may be implemented by computer program instructions, by special-purpose hardware-based computer systems, by combinations of special purpose hardware and computer instructions, by combinations of general-purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM); an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States, then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A processor-implemented method for address translation comprising:
    accessing a processor core, wherein the processor core includes a memory management unit (MMU) and a unified translation lookaside buffer (TLB) within the MMU, wherein the TLB is configured to support a plurality of page sizes, and wherein the processor core is coupled to an external memory system;
    receiving, by the TLB, a lookup request for a virtual memory address, wherein the virtual memory address corresponds to a process running on the processor core;
    accessing, by the TLB, a linked list, wherein the linked list comprises a page size priority order for the plurality of page sizes;
    performing a lookup, in the TLB, on the virtual memory address, wherein the lookup is conducted in the page size priority order, and wherein the lookup comprises executing a table walk of a page table, wherein the virtual memory address is missed in the TLB, and wherein the table walk includes a page fault if a page table is not found in a memory;
    updating the linked list, wherein the updating moves, to a location within the linked list, an element of the linked list that corresponds to a page size; and
    returning a physical address corresponding to the virtual memory address.

2. The method of claim 1 wherein updating the linked list further comprises counting a lookup of a page size within the plurality of page sizes.

3. The method of claim 2 further comprising preventing the updating the linked list until a number of accesses for the page size exceeds a threshold.

4. The method of claim 3 wherein the threshold is stored in a software-updatable configuration register.

5. The method of claim 1 wherein the linked list comprises a number of entries corresponding to the plurality of page sizes.

6. The method of claim 1 wherein the updating moves the page size associated with the lookup to the top of the linked list.

7. The method of claim 1 wherein the updating occurs on a TLB hit or TLB miss.

8. The method of claim 1 wherein a page size within the plurality of page sizes is stored in a TLB entry.

9. The method of claim 8 wherein the plurality of page sizes includes a four kilobyte page size, a two megabyte page size, a one gigabyte page size, and a 512 gigabyte page size.

10. The method of claim 9 wherein bits associated with the TLB entry vary according to the page size.

11. The method of claim 1 wherein the TLB comprises a 2-way, 4-way or an 8-way set associative cache.

12. The method of claim 11 wherein the TLB includes multiple ways and wherein an index checks entries in each of the ways of the TLB.

13. The method of claim 12 wherein a tag controls which of the ways of the TLB is selected.

14. The method of claim 1 wherein the TLB includes an Address Space Identifier (ASID) stored with a TLB entry.

15. The method of claim 14 wherein each process of a plurality of processes running on the processor core is assigned a unique ASID.

16. The method of claim 15 wherein the performing a lookup further comprises matching the unique ASID with an ASID stored within the TLB entry.

17. The method of claim 1 wherein the page table includes a multi-level page table.

18. The method of claim 1 wherein the page table is retrieved from an external storage device.

19. The method of claim 1 further comprising initializing the linked list.

20. The method of claim 19 wherein the linked list is initialized with an order from a smallest to a largest page size.

21. The method of claim 19 where the linked list is initialized with an order stored in a software-updatable configuration register.

22. A computer program product embodied in a non-transitory computer readable medium for address translation, the computer program product comprising code which causes one or more processors to generate semiconductor logic for:
accessing a processor core, wherein the processor core includes a memory management unit (MMU) and a unified translation lookaside buffer (TLB) within the MMU, wherein the TLB is configured to support a plurality of page sizes, and wherein the processor core is coupled to an external memory system;
receiving, by the TLB, a lookup request for a virtual memory address, wherein the virtual memory address corresponds to a process running on the processor core;
accessing, by the TLB, a linked list, wherein the linked list comprises a page size priority order for the plurality of page sizes;
performing a lookup, in the TLB, on the virtual memory address, wherein the lookup is conducted in the page size priority order, and wherein the lookup comprises executing a table walk of a page table, wherein the virtual memory address is missed in the TLB, and wherein the table walk includes a page fault if a page table is not found in a memory;
updating the linked list, wherein the updating moves, to a location within the linked list, an element of the linked list that corresponds to a page size; and
returning a physical address corresponding to the virtual memory address.

23. An apparatus for address translation comprising:
a processor core coupled to a memory wherein the processor core and the memory are used to perform operations comprising:
accessing the processor core, wherein the processor core includes a memory management unit (MMU) and a unified translation lookaside buffer (TLB) within the MMU, wherein the TLB is configured to support a plurality of page sizes, and wherein the processor core is coupled to an external memory system;
receiving, by the TLB, a lookup request for a virtual memory address, wherein the virtual memory address corresponds to a process running on the processor core;
accessing, by the TLB, a linked list, wherein the linked list comprises a page size priority order for the plurality of page sizes;
performing a lookup, in the TLB, on the virtual memory address, wherein the lookup is conducted in the page size priority order, and wherein the lookup comprises executing a table walk of a page table, wherein the virtual memory address is missed in the TLB, and wherein the table walk includes a page fault if a page table is not found in a memory;
updating the linked list, wherein the updating moves, to a location within the linked list, an element of the linked list that corresponds to a page size; and
returning a physical address corresponding to the virtual memory address.

* * * * *